[12] United States Patent
Watarai et al.

(10) Patent No.: US 6,617,074 B1
(45) Date of Patent: *Sep. 9, 2003

(54) LITHIUM ION POLYMER SECONDARY BATTERY AND GELATINOUS POLYMER ELECTROLYTE FOR SHEET BATTERY

(75) Inventors: Yusuke Watarai, Omiya (JP); Akio Minakuchi, Omiya (JP); Tadashi Kobayashi, Omiya (JP); Akihiro Higami, Omiya (JP); Sawako Takeuchi, Omiya (JP)

(73) Assignee: Mitsubishi Materials Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,556

(22) Filed: Apr. 10, 2000

(30) Foreign Application Priority Data

Jun. 30, 1999 (JP) .......................................... 11-185569
Jul. 7, 1999 (JP) .......................................... 11-192665
Jul. 15, 1999 (JP) .......................................... 11-201061

(51) Int. Cl.$^7$ ............................ H01M 4/58; H01M 6/12
(52) U.S. Cl. ............... 429/231.95; 429/162; 429/161; 429/127; 429/128; 429/300; 429/301; 429/302; 429/303
(58) Field of Search ..................... 429/231.95, 300, 429/301, 302, 303, 127, 162, 161, 128

(56) References Cited

U.S. PATENT DOCUMENTS 5,582,931 A * 12/1996 Kawakami .................. 429/127
5,858,264 A * 1/1999 Ichino et al. ............... 252/62.2
5,935,724 A * 8/1999 Spillman et al. ............... 429/9

* cited by examiner

Primary Examiner—Patrick Ryan
Assistant Examiner—Angela J. Martin
(74) Attorney, Agent, or Firm—Oblon, Spivak, McClelland, Maier & Neustadt, P.C.

(57) ABSTRACT

A lithium ion polymer secondary battery is a laminate of a positive-electrode sheet of a positive-electrode collector foil provided with an active material thereon, a negative-electrode sheet of a negative-electrode collector foil provided with another active material thereon, and a polymer electrolyte layer interposed between the positive-electrode sheet and the negative-electrode sheet. One of the positive-electrode sheet and the negative-electrode sheet is a strip and is fan-folded at least one time so that the positive-electrode sheet is provided on the surface of the active material on the sheet. The other one of the positive-electrode sheet and the negative-electrode sheet consists of a plurality of sheet segments having an area which is the same as the area of each flat portion of the fan-folded sheet. The sheet segments are interposed between the flat portions of the fan-folded sheet so that the polymer electrolyte layer is in contact with the surfaces of the active materials. The battery exhibits a large discharge capacity and improved discharge capacity characteristics after a number of discharge-charge cycles and does not cause internal short-circuiting.

17 Claims, 14 Drawing Sheets

LITHIUM ION POLYMER SECONDARY BATTERY AND GELATINOUS POLYMER ELECTROLYTE FOR SHEET BATTERY

BACKGROUND OF THE INVENTION

1. Field of the Invention

The present invention relates to a lithium ion polymer secondary battery composed of a lamination of a positive-electrode sheet, a negative-electrode sheet, and a polymer electrolyte layer provided therebetween, and to a gelatinous polymer electrolyte for sheet batteries which is used in the polymer electrolyte layer.

2. Description of the Related Art

In recent years, thin batteries have been in increasing demand with the spread of portable devices, such as video cameras and notebook personal computers. A typical thin battery is a lithium ion polymer secondary battery which is formed by laminating a positive-electrode sheet and a negative-electrode sheet. The positive-electrode sheet is prepared by forming an active material on a surface of a positive-electrode collector foil, and the negative-electrode sheet is prepared by forming an active material on a surface of a negative-electrode collector foil. A polymer electrolyte layer is disposed between the active material on the positive-electrode sheet and the active material on the negative-electrode sheet. The positive-electrode collector foil and the negative-electrode collector foil are provided with a positive-electrode terminal and a negative-electrode terminal, respectively, from which a current generated by a potential between these two active materials is extracted. Such a laminate is hermetically packed to form a lithium ion polymer secondary battery. The positive-electrode terminal and the negative-electrode terminal are led out from the package and are used as terminals to supply a predetermined potential from the lithium ion polymer secondary battery.

Polymer solid electrolytes using ion-conducting polymers have been used as electrolytes for such sheet batteries in order to prevent leakage of electrolyte solutions. In polymer solid electrolytes, electrolytes are homogeneously dissolved into polymers. The polymer solid electrolytes are flexible and are suitable for use in sheet batteries. A problem of the polymer solid electrolytes is significantly low ion conductivity compared to electrolyte solutions. Thus, batteries using the polymer solid electrolytes exhibit low charging current densities and high electrical resistance.

In order to solve such a problem, Japanese Unexamined Patent Publication No. 10-321210 discloses a separator for nonaqueous batteries. In this separator, an electrolyte solution having high ion conductivity is impregnated in open pores formed on two surfaces of a membrane electrolyte. As a result, ion conductivity of batteries is improved and the batteries maintain high current densities.

However, the areas of the positive-electrode sheet and the negative-electrode sheet must be increased in order to increase the discharge capacity of the lithium ion polymer secondary batteries. If the areas of these sheets are simply increased, the resulting batteries have large areas compared to the thicknesses thereof and will not be readily used. When the sheets are folded to solve such a problem, deflection occurs between the positive-electrode sheet and the negative-electrode sheet at folded portions, so that these sheets become detached from the electrolyte layer. Thus, the effective surface area of the interface between the electrodes and the electrolyte is reduced, resulting in a decreased discharge capacity and deterioration of discharge capacity characteristics after a number of discharge-charge cycles due to increased internal resistance. When the deflection is significant, direct contact between the positive-electrode sheet and the negative-electrode sheet, so-called "internal short-circuiting" will occur at the deflected portion.

Since the polymer electrolyte layer disposed between the two active materials is relatively thin, these two active materials or collector foils, which are laminated at ends of the polymer electrolyte layer, may come into contact with each other by misalignment of lamination or by an external force applied to the laminate, resulting in internal short-circuiting.

As described above, the separator for nonaqueous batteries has open pores on the two surfaces thereof. If the separator insufficiently comes into contact with the positive-electrode sheet or the negative-electrode sheet, the electrolyte solution impregnated in these pores may leak. Moreover, intercalate/deintercalate cycles of ions in the electrodes cause a change in volume, and thus a gap may be formed between the separator and the positive- and/or negative-electrode sheets. Such a gap also causes leakage of the electrolyte solution. Because the sheet battery is bent according to the shape of the space for the battery in some cases, a gap may be formed between the between the separator and the positive- and/or negative-electrode sheets due to the stress during bending, resulting in leakage of the electrolyte solution. In addition, gas is produced in the battery during the charging/discharging cycles. When the gas is trapped on the surfaces of the positive and/or negative electrodes, the gas precludes ion mobility in the battery. Thus, the effective surface area at the interface between the electrodes and the electrolyte decreases, resulting in increased internal resistance and deterioration of discharge capacity characteristics after a number of discharge-charge cycles.

SUMMARY OF THE INVENTION

Accordingly, it is an object of the present invention to provide a lithium ion polymer secondary battery which does not cause internal short-circuiting, and which has a large discharge capacity and improved discharge capacity characteristics after a number of discharge-charge cycles.

It is another object of the present invention to provide a lithium ion polymer secondary battery which does not cause internal short-circuiting without a decreased discharge capacity.

It is still another object of the present invention to provide a gelatinous polymer electrolyte for sheet batteries, which is free from leakage of an electrolyte solution, which has improved discharge capacity characteristics after a number of discharge-charge cycles, and which exhibits high ion conductivity.

According to a first aspect of the present invention, a lithium ion polymer secondary battery includes a laminate of a strip of positive-electrode sheet having a positive-electrode collector foil and a first active material provided on the positive-electrode collector foil, a plurality of negative-electrode sheets, each including a negative-electrode collector foil and a second active material provided on the negative-electrode collector foil, and at least one polymer electrolyte layer. The polymer electrolyte layer is provided on at least one surface of the first active material, the strip of positive-electrode sheet is fan-folded at least one time, each of the negative-electrode sheets has a predetermined area corresponding to the area of flat portions of the folded positive-electrode sheet and is interposed between the flat portions of the folded positive-electrode sheet, and the polymer electrolyte layer is interposed between the first active material and the second active material.

According to a second aspect of the present invention, a lithium ion polymer secondary battery includes a laminate of a strip of negative-electrode sheet having a negative-electrode collector foil and a second active material provided on the negative-electrode collector foil, a plurality of positive-electrode sheets, each including a positive-electrode collector foil and a first active material provided on the positive-electrode collector foil, and at least one polymer electrolyte layer. The polymer electrolyte layer is provided on at least one surface of the second active material, the strip of negative-electrode sheet is fan-folded at least one time, each of the positive-electrode sheets has a predetermined area corresponding to the area of flat portions of the folded negative-electrode sheet and is interposed between the flat portions of the folded negative-electrode sheet, and the polymer electrolyte layer is interposed between the first active material and the second active material.

In the first or the second aspect, the strip of positive-electrode sheet or the strip of negative-electrode sheet is fan-folded. Thus, the lithium ion polymer secondary battery has a large discharge capacity without an increased area. Since the negative-electrode sheets or positive-electrode sheets are not arranged at folds of the strip electrode sheet, no deflection occurs between the positive-electrode sheet and the negative-electrode sheet. Since the first or second active materials on the separated positive- or negative-electrode collector foils are in contact with the same electrolyte layer, the internal resistance becomes uniform with respect to the active materials, resulting in improved discharge capacity characteristics after a number of discharge-charge cycles.

In the first aspect, the polymer electrolyte layer is preferably provided on at least one surface of the second active material. In the second aspect, the polymer electrolyte layer is preferably provided on at least one surface of the first active material. In such configurations, the polymer electrolyte layer contributes to a reduced internal resistance, improved discharge capacity characteristics after a number of discharge-charge cycles, and improved charge-discharge efficiency.

Preferably, in the first and second aspects, the polymer electrolyte layer covers the entire first active material so as to extend over at least one side edge of the first active material and/or the polymer electrolyte layer covers the entire second active material so as to protrude from at least one side edge of the second active material. A large contact area is ensured between the active materials and the polymer electrolyte layer. Thus, the battery has a large effective electrode area which contributes to reduced internal resistance. Moreover, the polymer electrolyte layer protects the active materials from drying. Thus, an increase in the internal resistance is suppressed and discharge capacity characteristics after a number of discharge-charge cycles and the charge-discharge efficiency are further improved.

Preferably, in the first aspect, one side edge of the positive-electrode collector foil protrudes from one side edge of each of the negative-electrode collector foils and the other side edge of each of the negative-electrode collector foils protrudes from the other side edge of the strip positive-electrode collector foil, the protruding portions of the positive-electrode collector foil are connected to a positive-electrode terminal, and the protruding portions of the negative-electrode collector foils are connected to a negative-electrode terminal. Preferably, in the second aspect, one side edge of the negative-electrode collector foil protrudes from one side edge of each of the positive-electrode collector foils and the other side edge of each of the positive-electrode collector foils protrudes from the other side edge of the negative-electrode collector foil, the protruding portions of the negative-electrode collector foil are connected to a negative-electrode terminal, and the protruding portions of the positive-electrode collector foils are connected to a positive-electrode terminal.

In the above configurations, the positive-electrode terminal and the negative-electrode terminal can be readily provided in the lithium ion polymer secondary battery.

According to a third aspect of the present invention, a lithium ion polymer secondary battery includes at least one positive-electrode collector foil provided with a first active material on a surface thereof, at least one negative-electrode collector foil provided with a second active material on a surface thereof, and at least one polymer electrolyte layer. The positive-electrode collector foil, the polymer electrolyte layer, and the negative-electrode collector foil are laminated so that one side edge of the positive-electrode collector foil protrudes from one side edge of the negative-electrode collector foil and the other side edge of the negative-electrode collector foil protrudes from the other side edge of the positive-electrode collector foil. Insulating films are provided in both side edges of the polymer electrolyte layer over the entire length so as to protrude from the side edges.

In this lithium ion polymer secondary battery, the insulating films provided at both edges of the polymer electrolyte layers protect the positive-electrode sheets and the negative-electrode sheets from short-circuiting due to misalignment in the lamination process or external force applied to the laminate. If the edges of the polymer electrolyte layer are melted in the thermal compression bonding process, the insulating films protect the positive-electrode collector foil and the negative-electrode collector foil from short-circuiting due to the melt of the polymer electrolyte layer.

Since each polymer electrolyte layer satisfactorily functions even at the side edges having the insulating films, the effective areas of each positive-electrode sheet and each negative-electrode sheet do not decrease.

Preferably, a ratio $t_2/t_1$ of a thickness $t_2$ of the insulating film to a thickness $t_1$ of the polymer electrolyte layer is in a range of 0.01 to 0.7. In such a ratio, the insulating films do not cause an increased total thickness of the polymer electrolyte layers. Thus, the lithium ion polymer secondary battery can be prevented from increasing in size due to the insulating films.

Preferably, a ratio $s_2/s_1$ of a length $s_2$ of the protruding portion of the insulating film at the side edge of the polymer electrolyte layer to a length $s_1$ of the protruding portions of the negative-electrode collector foil and the positive-electrode collector foil is preferably in a range of 0.02 to 0.8.

Since the ratio $s_2/s_1$ is in the specified range, the insulating film can securely prevent contact between the active materials and between the positive-electrode collector foil and the active material. Thus, internal short-circuiting between the positive-electrode sheets and the negative-electrode sheets in the laminate does not occur and the discharge capacity can be readily increased.

According to a fourth aspect of the present invention, a gelatinous polymer electrolyte, interposed between a positive-electrode sheet and a negative-electrode sheet of a sheet battery, includes a gelatinous polymer, wherein many closed pores are substantially uniformly confined in a matrix of the gelatinous polymer and are filled with at least gas and optionally an electrolyte solution.

The gas in the closed pores moderates a change in volume and internal pressure due to discharge and charge of ions in the electrodes and a stress generated when the sheet battery is bent. Thus, the polymer electrolyte does not separate from the positive-electrode sheet or the negative-electrode sheet due to external force. As a result, the gelatinous polymer electrolyte improves discharge capacity characteristics after a number of discharge-charge cycles of the battery compared to conventional solid polymer electrolyte.

Preferably, the pores in the gelatinous polymer electrolyte have diameters of 5 to 20 μm and occupy 0.1 to 30 percent by volume of the matrix of the gelatinous polymer. The discharge capacity characteristics after a number of discharge-charge cycles are further improved.

Preferably, the pores are filled with 0 to 30 percent by volume of the electrolyte solution and 70 to 100 percent by volume of the gas.

In the gelatinous polymer electrolyte having such a configuration, the electrolyte solution is trapped in the pores and contributes to ion conduction. Thus, the gelatinous polymer electrolyte exhibits improved ion conductivity compared to conventional solid polymer electrolytes, resulting in reduced internal resistance of the battery. The battery exhibits sufficient functions even if the electrolyte solution is not trapped in the pores.

DESCRIPTION OF THE PREFERRED EMBODIMENTS

A first embodiment of the present invention will now be described in detail with reference to the drawings.

Figure 1:
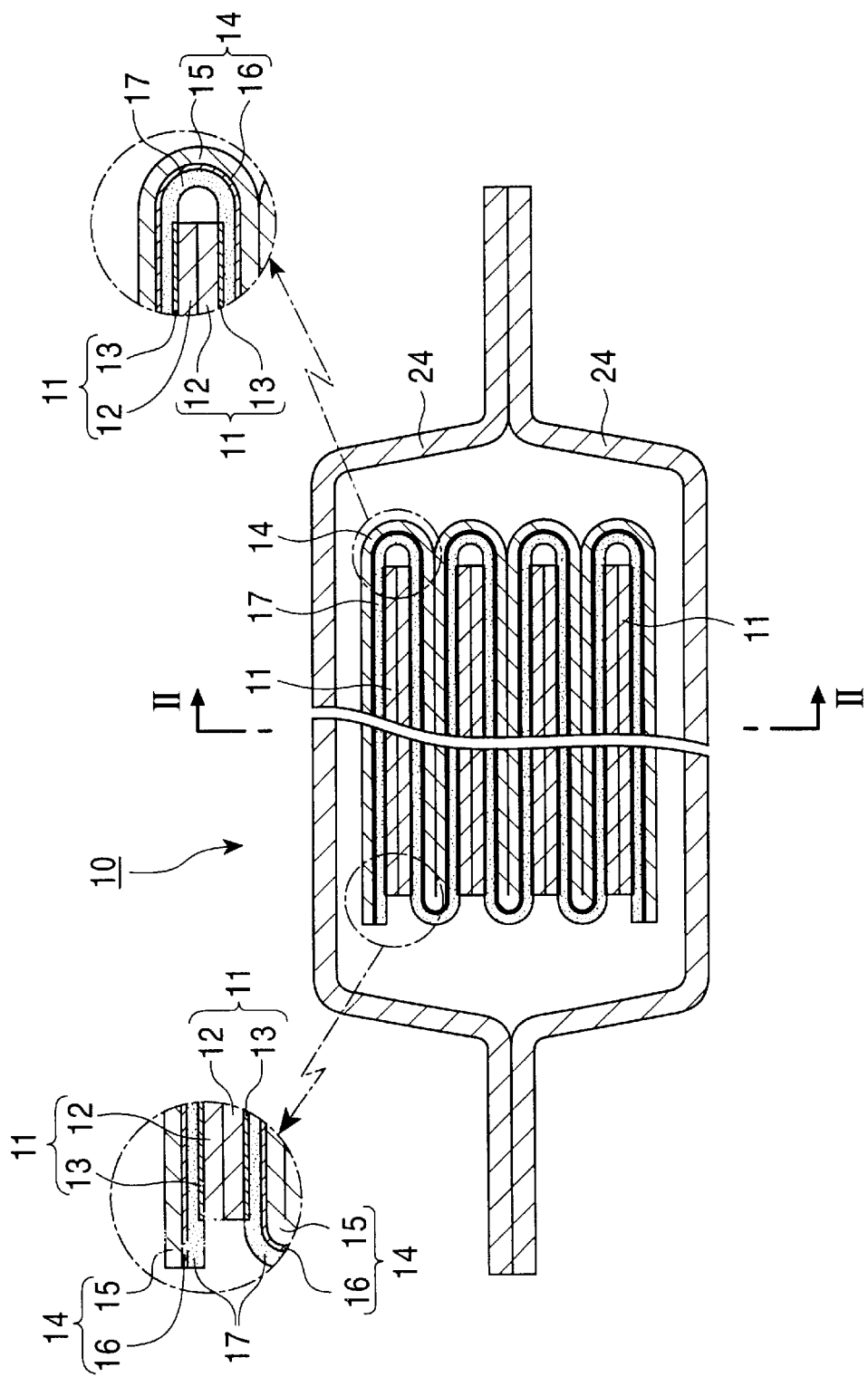
FIG. 1 is a cross-sectional view taken along line I—I in FIG. 2 showing a secondary battery in accordance with a first embodiment of the present invention.

As shown in FIG. 1, a lithium ion polymer secondary battery 10 of the first embodiment includes a laminate of positive-electrode sheets 11 and a negative-electrode sheet 14, and a polymer electrolyte layer 17 is disposed between the positive-electrode sheets 11 and the negative-electrode sheet 14. Each positive-electrode sheet 11 includes a positive-electrode collector foil 12 and an active material 13 provided on a surface of the positive-electrode collector foil 12, and the negative-electrode sheet 14 includes a negative-electrode collector foil 15 and an active material 16 provided on a surface of the negative-electrode collector foil 15. Thus, the polymer electrolyte layer 17 is interposed between the active material 13 on the positive-electrode collector foil 12 and the active material 16 on the negative-electrode collector foil 15. In this lithium ion polymer secondary battery 10, the negative-electrode collector foil 15 is a strip of foil which contributes to an increased discharge capacity, and is fan-folded so that the active material 16 comes into contact with the polymer electrolyte layer 17. In this embodiment, the negative-electrode collector foil 15 is formed of copper, and the active material 16 is a graphite material.

Figure 6A:
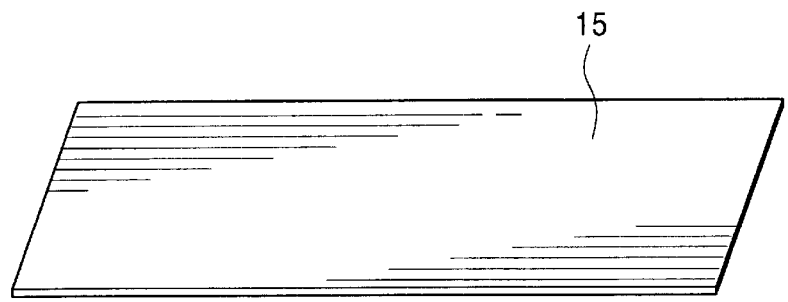
FIGS. 6A to 6C are perspective views showing manufacturing steps of a negative-electrode sheet.
Figure 6B:
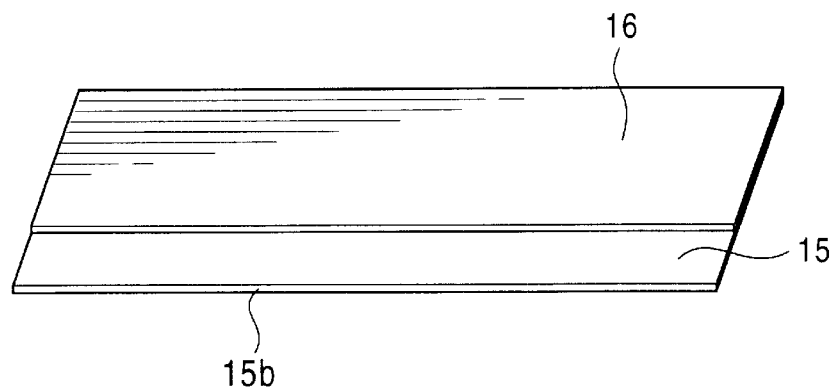
Figure 6C:
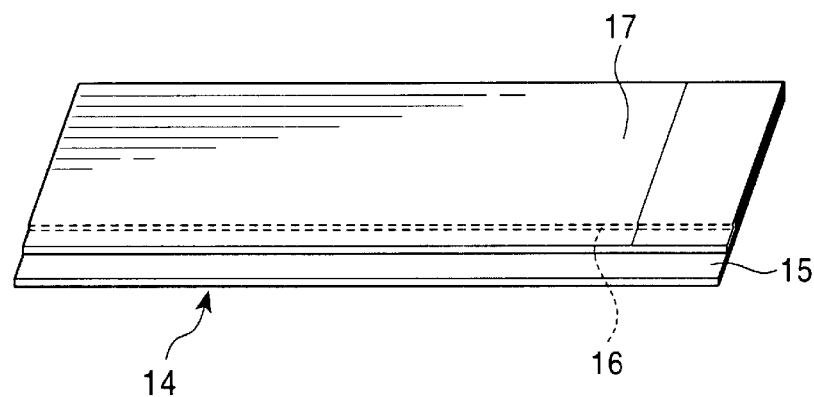

With reference to FIGS. 6A to 6C, slurry of the active material 16 is applied onto a surface, other than one side edge 15b, of the strip of negative-electrode collector foil 15, by a doctor blade process, and then is dried. Next, slurry of the polymer electrolyte layer 17 is applied onto the entire active material 16 and a part of the negative-electrode collector foil 15 and is then dried so as to completely cover the active material 16 and to extend over a side edge of the active material 16, as shown in FIG. 6C.

With reference to FIG. 1 again, in the lithium ion polymer secondary battery 10, a plurality of positive-electrode sheets 11 is interposed between the flat portions of the polymer electrolyte layer 17 which is fan-folded with the negative-electrode sheet 14. Thus, the polymer electrolyte layer 17 also comes into contact with the active material 13 on the positive-electrode sheets 11. In this embodiment, the positive-electrode collector foil 12 is composed of aluminum and the active material 13 is composed of, for example, $LiCoO_2$.

Figure 5A:
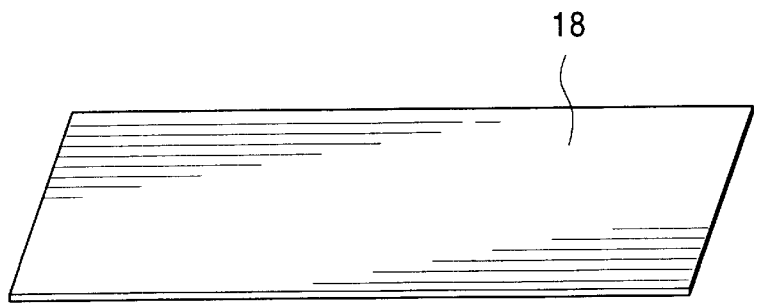
FIGS. 5A to 5D are perspective views showing manufacturing steps of a positive-electrode sheet.
Figure 5B:
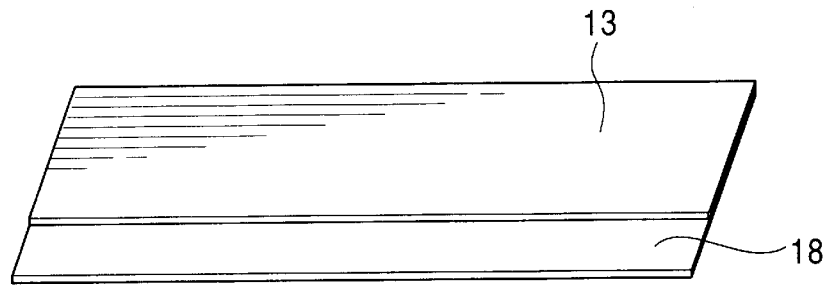
Figure 5C:
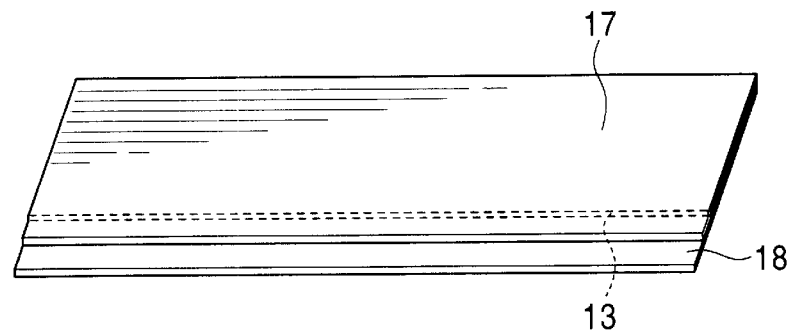
Figure 5D:
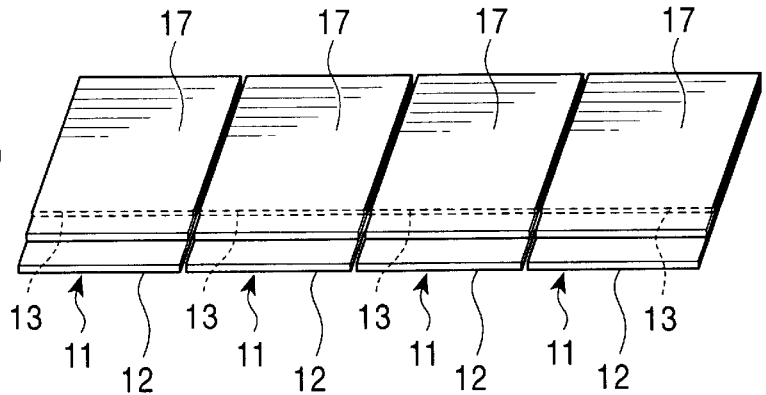

With reference to FIGS. 5A and 5B, slurry of the active material 13 is applied onto a surface, other than one side edge, of an aluminum foil 18 and is then dried to form the active material 13. With reference to FIG. 5C, slurry of the polymer electrolyte layer 17 is applied onto the entire active material 13 and a part of the aluminum foil 18 and is dried so as to completely cover the active material 13 and to extend over a side edge of the active material 13. With reference to FIG. 5D, the aluminum foil 18 is cut into a plurality of positive-electrode sheets 11 having the active material 13 and the polymer electrolyte layer 17.

Figure 4:
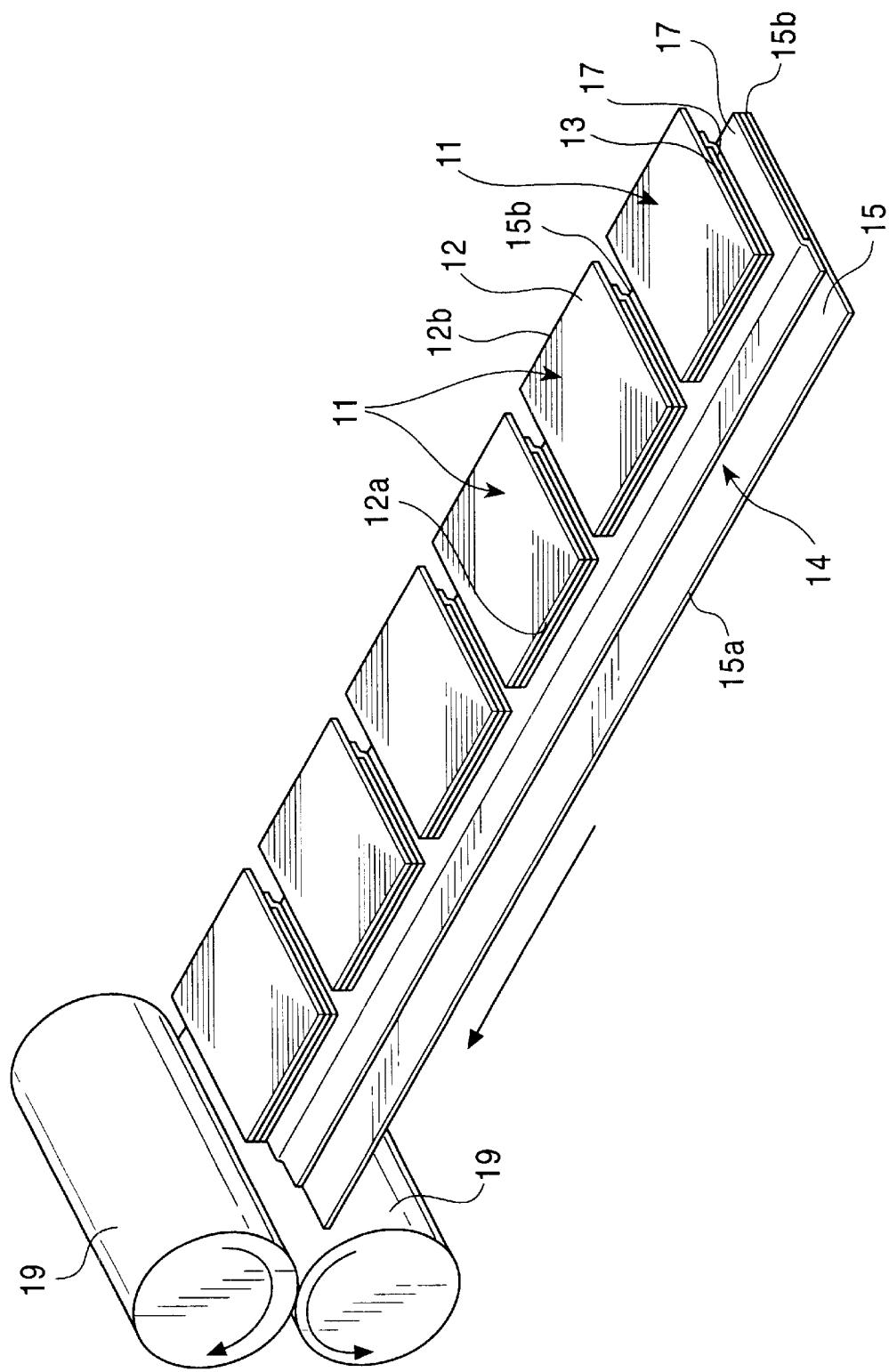
FIG. 4 is a perspective view showing thermal compression bonding of a positive-electrode sheet to a negative-electrode sheet of the secondary battery in accordance with the first embodiment.

With reference to FIG. 4, the positive-electrode sheets 11 and the negative-electrode sheet 14 are laminated so that the polymer electrolyte layer 17 is interposed therebetween. The lamination is performed by thermal compression bonding.

That is, the positive-electrode sheets 11 are arranged at a predetermined pitch, which corresponds to the distance between the folds, on the negative-electrode sheet 14, and the negative-electrode sheet 14 is led into a pair of rotating hot rollers 19, as shown by arrows in the drawing, to bond the positive-electrode sheets 11 and the negative-electrode sheet 14 with the polymer electrolyte layer 17 therebetween by thermal compression. In such an arrangement, a side edge 15a of the strip of negative-electrode collector foil 15 protrudes from a side edge 12a of each positive-electrode collector foil 12, while another side edge 12b of each positive-electrode collector foil 12 protrudes from the other side edge 15b of the negative-electrode collector foil 15.

Figure 2:
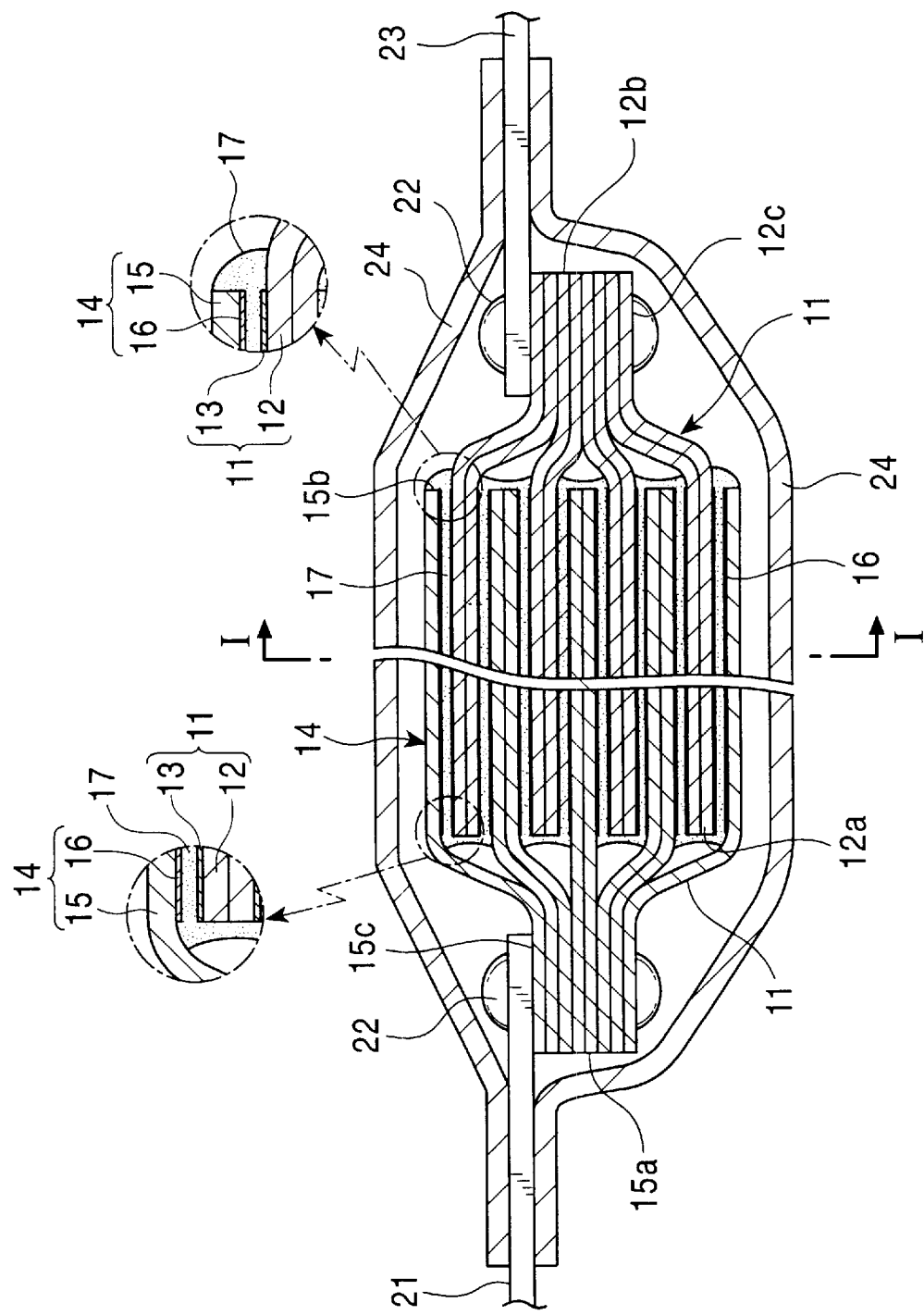
FIG. 2 is a cross-sectional view taken along line II—II in FIG. 1.
Figure 3:
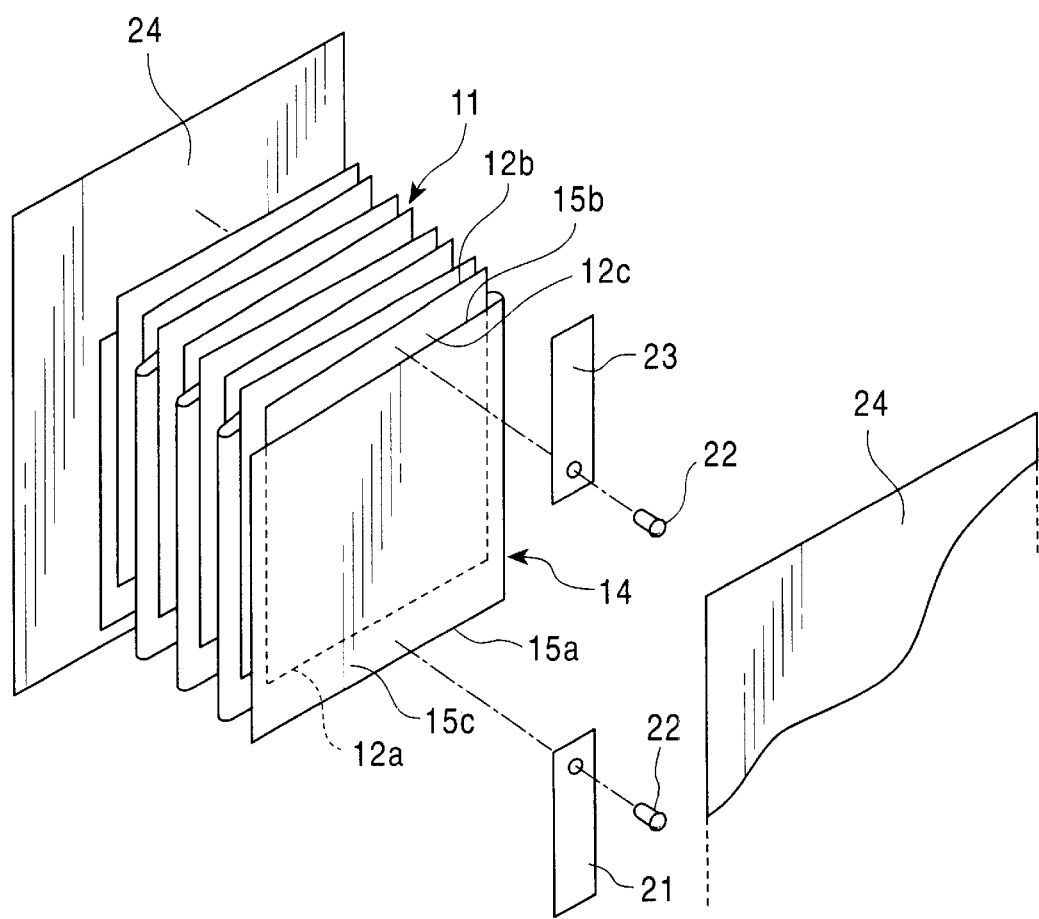
FIG. 3 is an exploded perspective view showing a configuration of the battery of the first embodiment.

With reference to FIG. 3, the laminate of the negative-electrode sheet 14 and the positive-electrode sheets 11 is fan-folded at blank portions between the positive-electrode sheets 11. Thus, the side edge 15a of the negative-electrode collector foil 15 protrudes from the side edge 12a of each positive-electrode collector foil 12 while the other side edge 12b of each positive-electrode collector foil 12 protrudes from the other side edge 15b of the negative-electrode collector foil 15 in the folded laminate. With reference to FIG. 1, the positive-electrode sheets 11 are interposed between the flat portions of the polymer electrolyte layers 17 on the folded negative-electrode sheet 14. With reference to FIGS. 2 and 3, the folded side edge 15a, that is, a projection 15c of the negative-electrode collector foil 15 is fastened to one end of a negative terminal 21 with a fastener 22, whereas the side edges 12b, that is, a projection 12c of the positive-electrode collector foils 12 is fastened to one end of a positive terminal 23 with another fastener 22.

With reference to FIGS. 1 and 2, the folded negative-electrode sheet 14 and the positive-electrode sheets 11 are enclosed in a pair of packaging sheets 24. In this embodiment, each packaging sheet 24 is composed of an aluminum foil laminated with polypropylene. The packaging sheets 24 are bonded to each other at peripheries thereof by thermal compression in a vacuum or an inert gas atmosphere so that the other end of the positive terminal 23 and the other end of the negative terminal 21 are exposed to the exterior. The exposed end of the positive terminal 23 and the exposed end of the negative terminal 21 are used as terminals of the lithium ion polymer secondary battery 10.

In the lithium ion polymer secondary battery 10, the negative-electrode sheet 14 having a large area is folded. Thus, the discharge capacity can be increased while the thickness is maintained to a low level. In addition, the positive-electrode sheets 11 are interposed between the flat portions of the polymer electrolyte layer 17. Thus, no deflection occurs between the positive-electrode sheets 11 and the negative-electrode sheet 14 because the positive-electrode sheets 11 are not arranged at folds of the negative-electrode sheet 14. As a result, the lithium ion polymer secondary battery 10 does not cause internal short-circuiting.

Moreover, the polymer electrolyte layer 17 is preliminarily formed on the surface of the active material 13 of each positive-electrode sheet 11 before the positive-electrode sheets 11 are interposed. This process can decrease the internal resistance of the laminate of the positive-electrode sheets 11, the polymer electrolyte layer 17, and the negative-electrode sheet 14. Since the polymer electrolyte layer 17 has an area which is sufficient to entirely cover the active materials 13 and 16 on the positive-electrode sheets 11 and the negative-electrode sheet 14, respectively, the effective electrode areas are increased and thus the internal resistance is further decreased. In addition, the polymer electrolyte layer 17 suppresses drying of the active materials at the edges thereof, and thus suppresses increased internal resistance at these edges. Accordingly, discharge capacity characteristics after a number of discharge-charge cycles and the charge-discharge efficiency are improved.

Figure 7:
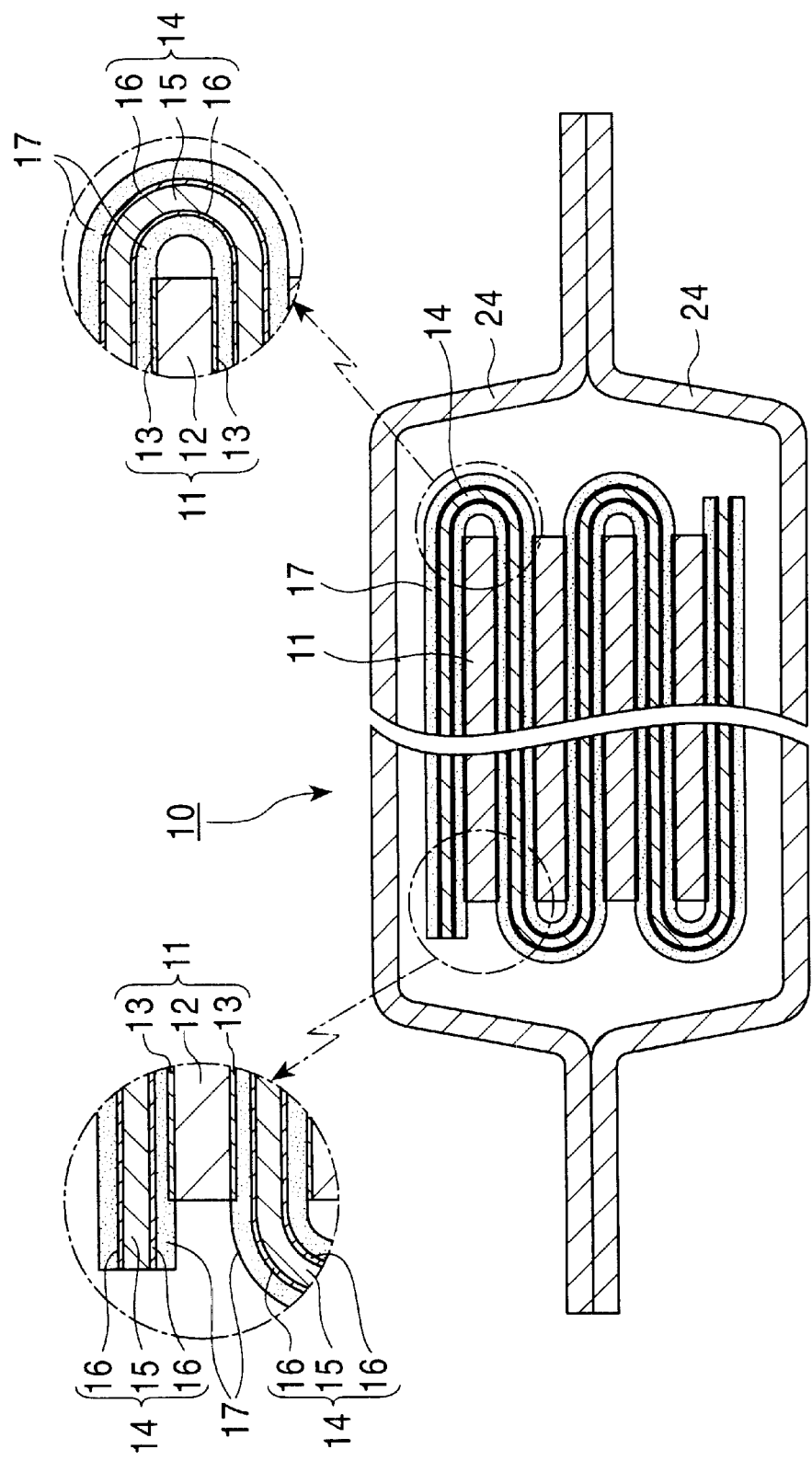
FIG. 7 is a cross-sectional view of another secondary battery.
Figure 8:
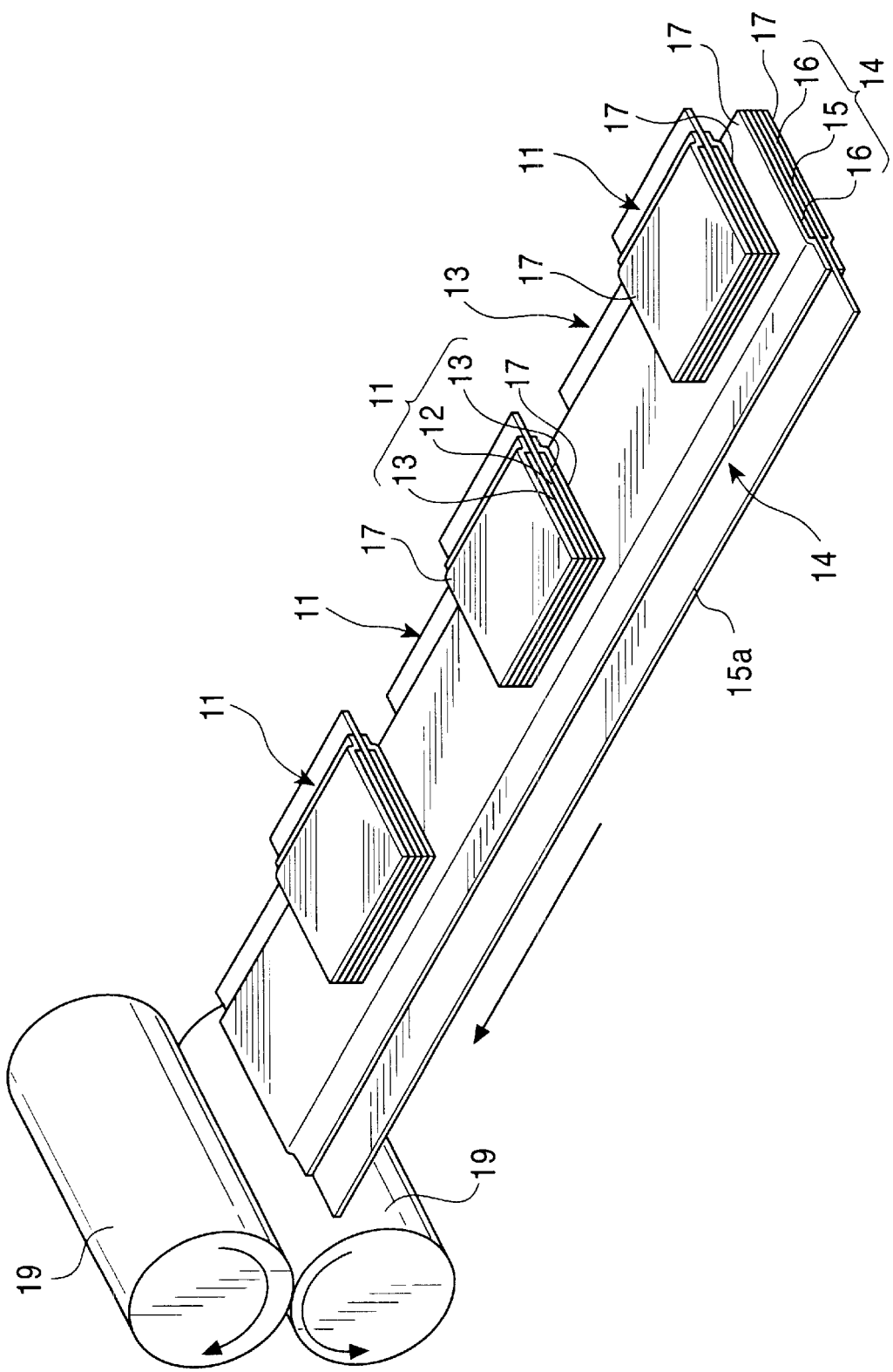
FIG. 8 is a perspective view showing thermal compression bonding of a positive-electrode sheet to a negative-electrode sheet of the other secondary battery.

Instead of the process shown in FIG. 4, the laminate may be produced by another process shown in FIG. 8. The active material 13 is applied onto the two surfaces of the positive-electrode collector foil 12 of each positive-electrode sheet 11, and the active material 16 is applied onto the two surface of the negative-electrode collector foil 15 of the strip of negative-electrode sheet 14. A plurality of positive-electrode sheets 11 is alternately bonded onto two surfaces of the negative-electrode sheet 14 by thermal compression at a given pitch which is larger than two times the width of each positive-electrode sheet 11. With reference to FIG. 7, the negative-electrode sheet 14 is fan-folded at blank portions which are not provided with the positive-electrode sheets 11. As a result, the flat portions of the negative-electrode sheet 14 and the positive-electrode sheets 11 are alternately deposited. In such a configuration, the lithium ion polymer secondary battery 10 has an improved energy density. In the case of such two polymer electrolyte layers, discharge capacity characteristics after a number of discharge-charge cycles are improved when the number of laminations is three or more (in other words, the number of folds is two or more).

In another configuration (not shown in the drawing) instead of the above configurations of the folded negative-electrode sheet 14, a strip of positive-electrode sheet provided with a polymer electrolyte layer on one surface thereof or polymer electrolyte layers may be fan-folded one time or more, and a plurality of negative-electrode sheets, each having a predetermined area, are inserted between the flat portions of the folded positive-electrode sheet. In this case, the polymer electrolyte layer is formed on the surface of the interposed negative-electrode sheet.

In the above embodiment, the polymer electrolyte layer 17 is formed on the active material 13 provided on each positive-electrode sheet 11. However, the polymer electrolyte layer may not be preliminarily formed on the active material on each positive-electrode sheet when the polymer electrolyte layer is provided on the surface of the active material on the negative-electrode sheet and when the positive-electrode sheets and the negative-electrode sheet are laminated.

In FIG. 4, the active materials and the polymer electrolyte layers are provided on one surface of the positive-electrode sheet and one surface of the negative-electrode sheet, while in FIG. 8, the active materials and the polymer electrolyte layers are provided on both surfaces of the positive-electrode sheet and both surfaces of the negative-electrode sheet. Alternatively, the active materials and the polymer electrolyte layer may be provided on both surfaces of the positive-electrode sheet and provided on one surface of the negative-electrode sheet, preferably of a strip, or may be provided on both surfaces of the negative-electrode sheet and provided on one surface of the positive-electrode sheet, preferably of a strip.

A second embodiment of the present invention will now be described in detail with reference to the drawings.

Figure 10:
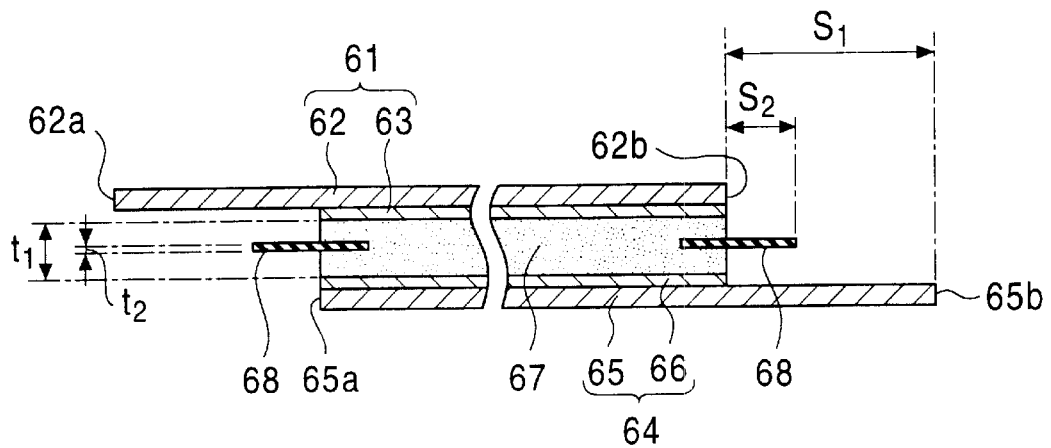
FIG. 10 is a cross-sectional view of a laminate of a positive-electrode sheet and a negative-electrode sheet in accordance with a second embodiment of the present invention.

With reference to FIG. 10, a lithium ion polymer secondary battery in the second embodiment includes a laminate of positive-electrode sheets 61, negative-electrode sheets 64, and polymer electrolyte layers 67 interposed between the positive-electrode sheets 61 and the negative-electrode sheets 64. Each positive-electrode sheet 61 is composed of a positive-electrode collector foil 62 and an active material 63 provided thereon. Each negative-electrode sheet 64 is composed of a negative-electrode collector foil 65 and an active material 66 provided thereon. Thus, each polymer electrolyte layer 67 is interposed between the active material 63 on the positive-electrode collector foil 62 and the active material 66 on the negative-electrode collector foil 65. The positive-electrode collector foil 62 is composed of aluminum, whereas the negative-electrode collector foil 65 is composed of copper. The active material 63 of the positive-electrode sheets 61 is $LiCoO_2$, whereas the active material 66 of the negative-electrode sheets 64 is a graphite material.

Figure 11:
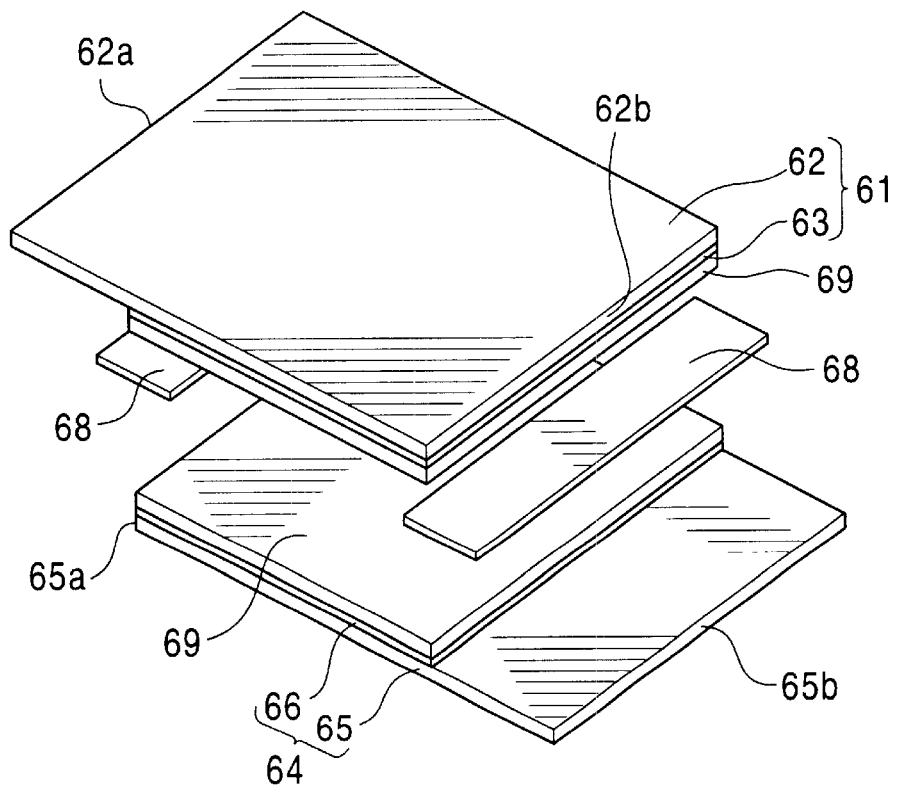
FIG. 11 is an exploded perspective view of the laminate of the positive-electrode sheet and the negative-electrode sheet in FIG. 10.

With reference to FIGS. 10 and 11, the active materials 63 and 66 are formed on the positive-electrode collector foil 62 and the negative-electrode collector foil 65, respectively, as follows. Slurry of the active material 63 for the positive electrode is applied onto the upper surface, other than one side edge 62a, of the positive-electrode collector foil 62 by a doctor blade process and is dried. Slurry of the active material 66 for the negative electrode is applied onto the upper surface, other than one side edge 65b, of the negative-electrode collector foil 65 by a doctor blade process and is dried. The positive-electrode sheets 61, the polymer electrolyte layers 67, and the negative-electrode sheets 64 are laminated to each other by thermal compression bonding so that each polymer electrolyte layer 67 is interposed between the active material 63 and the active material 66.

In the thermal compression bonding process, an electrolyte slurry 69, which will later constitute the polymer electrolyte layer 67, is applied onto the surface of the active material 63 and the surface of the active material 66 and is dried. The electrolyte slurry 69 formed on the active material 63 and the electrolyte slurry 69 formed on the active material 66 are brought into direct contact with each other in the lamination process. The electrolyte slurry 69 may be formed on only the active material 63 of the positive-electrode sheet 61 or the active material 66 of the negative-electrode collector foil 65 in this embodiment.

The positive-electrode sheets 61 and the negative-electrode sheets 64 are laminated so that the side edge 62a of each positive-electrode collector foil 62 protrudes from one side edge 65a of each negative-electrode collector foil 65 and the other side edge 65b of the negative-electrode collector foil 65 protrudes from another side edge 62b of the positive-electrode collector foil 62. In the thermal compression bonding process, the electrolyte slurry 69 on the active material 63 and the electrolyte slurry 69 on the active material 66 are thermally fused and are cured to form the polymer electrolyte layer 67, as shown in FIG. 10. In the laminate of the positive-electrode sheets 61 and the negative-electrode sheets 64, each polymer electrolyte layer 67 is interposed between the active material 63 and the active material 66, the side edge 62a of each positive-electrode collector foil 62 protrudes from the side edge 65a of each negative-electrode collector foil 65, and the side edge 65b of the negative-electrode collector foil 65 protrudes from the side edge 62b of the positive-electrode collector foil 62.

The second embodiment is characterized in that an insulating film 68 is inserted in both side edges of each polymer electrolyte layer 67 over the entire length so as to protrude from the side edges. In this embodiment, the insulating film 68 is, for example, a polyethylene terephthalate (PET) film having a width of 10 mm and a thickness of 4 $\mu$m. With reference to FIG. 11, in the lamination process, the insulating films 68 are placed between the electrolyte slurry 69 on the active material 63 and the electrolyte slurry 69 on the active material 66 at both side edges of the laminate. If the edges of the polymer electrolyte layer 67 are melted in the thermal compression bonding process, the insulating films 68 protect the positive-electrode collector foil 62 and the negative-electrode collector foil 65 from short-circuiting due to melting of the polymer electrolyte layer 67.

As shown in FIG. 10, the thickness $t_1$ of the polymer electrolyte layer 67 is proportional to the thickness of the electrolyte slurry 69 on the active material 63 and the electrolyte slurry 69 on the active material 66. In other words, the thickness $t_1$ of each polymer electrolyte layer 67 is controlled by the thicknesses of these electrolyte slurries 69. The ratio $t_2/t_1$ of the thickness $t_2$ of each insulating film 68 to the thickness $t_1$ of each polymer electrolyte layer 67 is preferably in a range of 0.01 to 0.7.

The ratio $s_2/s_1$ of the length $s_2$ of the protruding portion of the insulating film 68 at the side edge of the polymer electrolyte layer 67 to the length $s_1$ of the protruding portions of the negative-electrode collector foil 65 and the positive-electrode collector foil 62 is preferably in a range of 0.02 to 0.8. In the thermal compression bonding process of the positive-electrode sheet 61 and the negative-electrode sheet 64, the insulating film 68 is placed so as to satisfy the above ratio.

Figure 12:
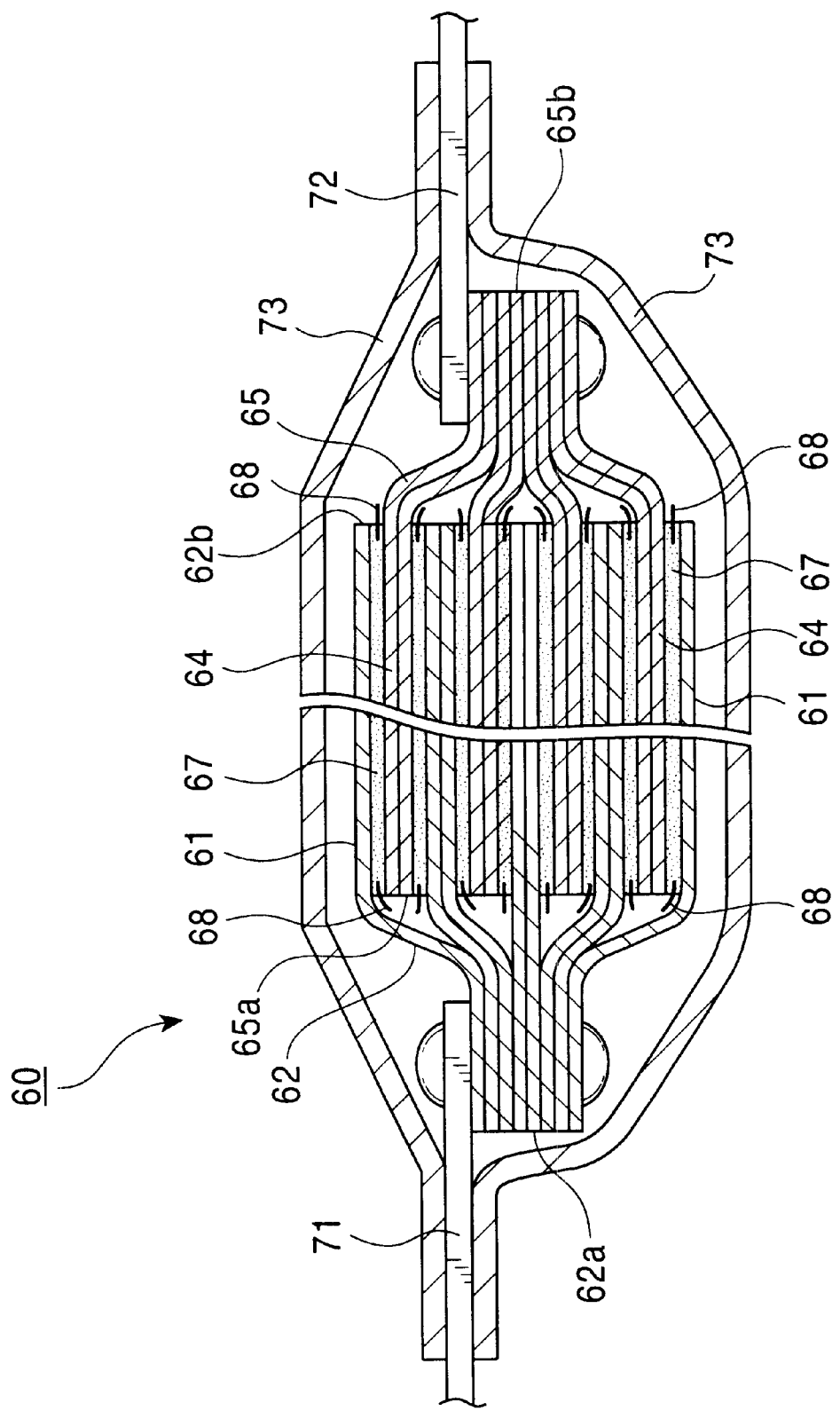
FIG. 12 is a cross-sectional view of a secondary battery including the laminate shown in FIG. 10.

With reference to FIG. 12, a lithium ion polymer secondary battery 60 in the second embodiment includes a laminate of a plurality of positive-electrode sheets 61 and a plurality of negative-electrode sheets 64 in order to increase discharge capacity. The protruding side edges 62a of the positive-electrode collector foils 62 are connected to one end of a positive terminal 71, whereas the protruding side edges 65b of the negative-electrode collector foils 65 are connected to one end of a negative terminal 72. These positive-electrode sheets 61 and negative-electrode sheets 64 are enclosed with a pair of packaging sheets 73. The packaging sheets 73 are composed of an aluminum foil laminated with polypropylene in this embodiment. The peripheries of the packaging sheets 73 are thermally sealed in a vacuum or inert gas atmosphere so that the other ends of the positive terminal 71 and the negative terminal 72 are exposed to the exterior. The exposed end of the positive terminal 71 and the exposed end of the negative terminal 72 are used as terminals of the lithium ion polymer secondary battery 60.

In the lithium ion polymer secondary battery 60, the insulating films 68 provided at both edges of the polymer electrolyte layers 67 protect the positive-electrode sheets 61 and the negative-electrode sheets 64 from short-circuiting due to misalignment in the lamination process or external force applied to the laminate. Since each polymer electrolyte layer 67 satisfactorily functions even at the side edges having the insulating films 68, the effective areas of each positive-electrode sheet 61 and each negative-electrode sheet 64 do not decrease. Thus, this secondary battery 60 can securely prevent internal short-circuiting while maintaining a high discharge capacity comparable to that of conventional secondary batteries.

Since the ratio $t_2/t_1$ of the thickness $t_2$ of each insulating film 68 to the thickness $t_1$ of each polymer electrolyte layer 67 is in a range of 0.01 to 0.7, the insulating films 68 do not cause an increased total thickness of the polymer electrolyte layers 67. Thus, the lithium ion polymer secondary battery can be prevented from increasing in size due to the insulating films 68. A ratio $t_2/t_1$ of less than 0.01 causes deterioration of insulation between the positive-electrode sheet 61 and the negative-electrode sheet 64, whereas a ratio $t_2/t_1$ exceeding 0.7 causes a decreased ion conductivity in the polymer electrolyte layer 67. More preferably the ratio $t_2/t_1$ is in a range of 0.06 to 0.63.

Since the ratio $s_2/s_1$ of the length $s_2$ of the protruding portion of the insulating film 68 at the side edge of the polymer electrolyte layer 67 to the length $s_1$ of the protruding portion of the negative-electrode collector foil 65 and the positive-electrode collector foil 62 is in a range of 0.02 to 0.8, the insulating film 68 can securely prevent contact between the active material 63 and the active material 66 and between the positive-electrode collector foil 62 and the active material 66. Thus, internal short-circuiting between the positive-electrode sheets 61 and the negative-electrode sheets 64 in the laminate does not occur and the discharge capacity can be readily increased. A ratio $s_2/s_1$ of less than 0.02 may cause contact between the active material 63 and the active material 66 and between the positive-electrode collector foil 62 and the negative-electrode collector foil 65 due to misalignment during the lamination process, whereas a ratio $s_2/s_1$ exceeding 0.8 precludes the lamination process. More preferably, the ratio $s_2/s_1$ is in a range of 0.2 to 0.8.

In the second embodiment, the electrolyte slurry 69 is applied onto the active material 63 and the active material 66. Alternatively the electrolyte slurry 69 may be applied only onto one of the active material 63 and the active material 66.

The insulating film 68 may be composed of polypropylene (PP), polyethylene (PE), a polyimide resin, a polyether polyimide resin, or a Teflon resin, instead of polyethylene terephthalate (PET).

A third embodiment of the present invention will now be described in detail with reference to the drawings.

Figure 13:
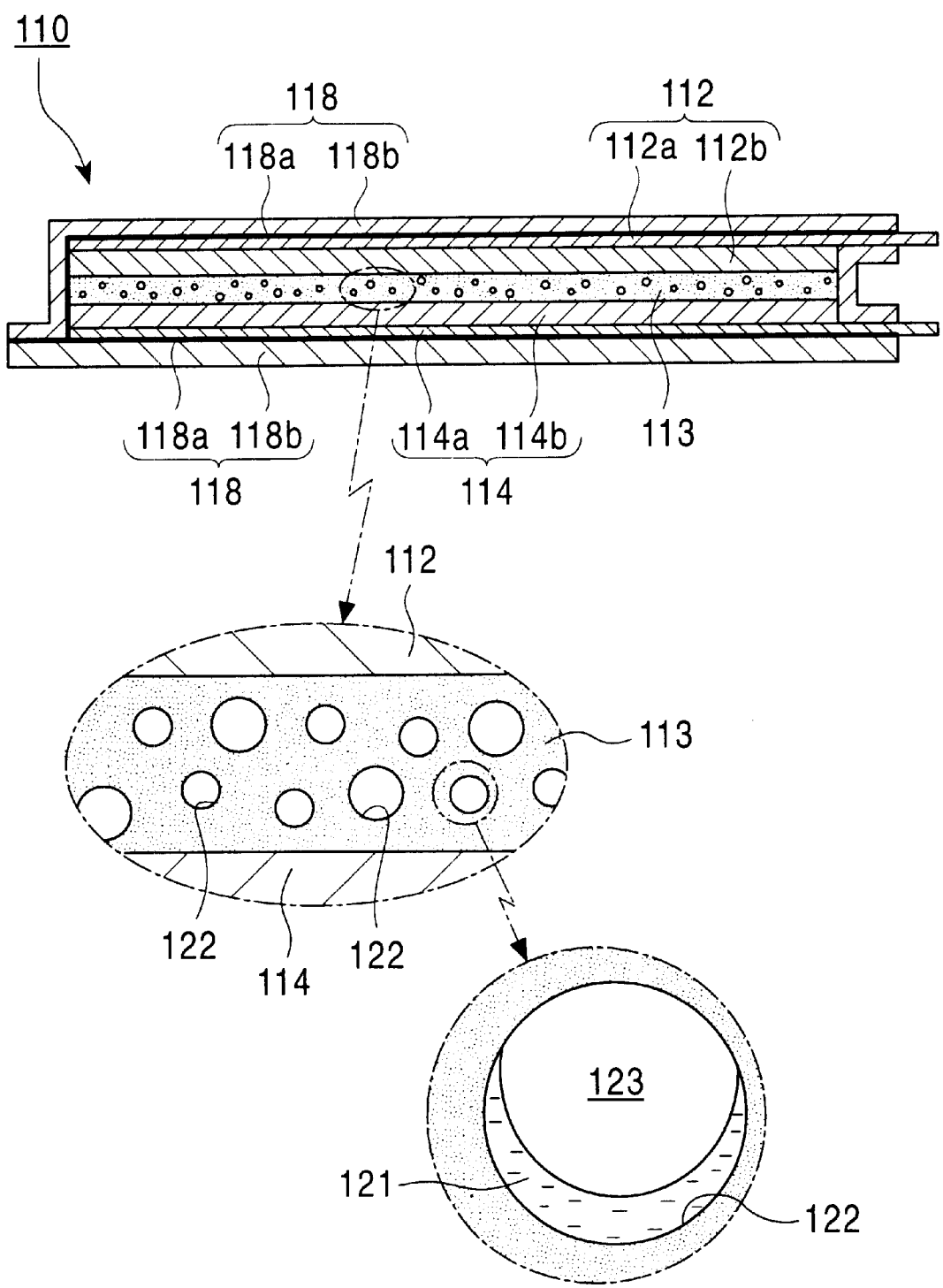
FIG. 13 is a longitudinal cross-sectional view of a sheet battery using an electrolyte in accordance with a third embodiment of the present invention.

With reference to FIG. 13, in a sheet battery 110, a positive-electrode sheet 112 composed of an aluminum foil 112a and an active material 112b provided thereon, a gelatinous polymer electrolyte 113, and a negative-electrode sheet 114 composed of a copper foil 114a and an active material 114b provided thereon are laminated in that order, and the laminate is enclosed in a pair of packaging sheets 118. The active material 112b of the positive-electrode sheet 112 is, for example, LiCoO$_2$, whereas the active material 114b of the negative-electrode sheet 114 is, for example, a graphite material. The positive-electrode sheet 112 and the negative-electrode sheet 114 are formed as follows. Slurry containing the active material 112b and conductive carbon is applied onto the aluminum foil 112a in a thickness of approximately 100 $\mu$m and is then dried at 80° C. to 120° C. to form the positive-electrode sheet 112. Also slurry containing the active material 114b and conductive carbon is applied onto the copper foil 114a in a thickness of approximately 100 $\mu$m and is then dried at 80° C. to 120° C. to form the negative-electrode sheet 114.

An electrolyte slurry is applied onto both the positive-electrode sheet 112 and the negative-electrode sheet 114 or either the positive-electrode sheet 112 or the negative-electrode sheet 114 over the entire surface(s) in a given thickness and is then dried at 60° C. to 100° C. to form the gelatinous polymer electrolyte 113 between the positive-electrode sheet 112 and the negative-electrode sheet 114. The positive-electrode sheet 112, the negative-electrode sheet 114, and the gelatinous polymer electrolyte 113 are laminated by thermal compression bonding at 90° C. to 120° C. The thickness of the gelatinous polymer electrolyte 113 is preferably in a range of 20 to 200 $\mu$m. The laminate is enclosed in the packaging sheets 118. Each packaging sheet 118 is composed of an aluminum foil 118b laminated with polypropylene 118a. The peripheries of the packaging sheets 118 are thermally sealed in a vacuum or inert gas atmosphere to form the sheet battery 110.

In the entire gelatinous polymer electrolyte 113, many closed pores 122 are uniformly formed and are filled with gas 123, or gas 123 and an electrolyte solution 121. When an electrolyte slurry having an appropriate viscosity is applied on the surface of the active materials 112b and 114b, the gas in the active materials 112b and 114b migrates to the electrolyte slurry and remains in the slurry as bubbles. If the viscosity of the slurry is significantly high, the bubbles remain at the interface between the active materials 112b and 114b and the electrolyte slurry. If the viscosity of the slurry is significantly low, the bubbles are released in the air through the electrolyte slurry. When the bubbles are formed in the slurry, the electrolyte solution 121 in the slurry is concentrated in the bubbles. When the electrolyte slurry is dried, many pores 122 are uniformly formed in the gelatinous polymer electrolyte 113, and contain gas 123 and the electrolyte solution 121.

The viscosity of the electrolyte slurry and the temperature when the slurry is dried are appropriately determined so as to form the many closed pores 122 confined in the gelatinous polymer electrolyte 113 and to adjust the ratio of the electrolyte solution 121 and the gas 123 in the pores 122. A preferred viscosity of the slurry is in a range of 10 to 300 cP, and a preferred temperature in the drying process is in a range of 25° C. to 100° C. At an optimized condition, the diameter of each pore 122 is in a range of 10 to 20 $\mu$m, and the total volume of the pores 122 is 0.1 to 30 percent in the gelatinous polymer matrix. When the pores have diameter of less than 5 $\mu$m or occupy less than 0.1 percent by volume of the matrix, the gelatinous polymer electrolyte 113 does not exhibit a sufficient change in volume and does not moderate the internal pressure generated in the sheet battery 110. When the pores have diameters exceeding 20 $\mu$m or occupy more than 30 percent by volume of the matrix, the gelatinous polymer electrolyte 113 has insufficient strength which may cause short-circuiting. The pores 122 are filled with 0 to 30 percent by volume of electrolyte solution 121 and 70 to 100 percent by volume of gas 123 composed of air. The ratio of the electrolyte solution to the pores is in a range of preferably 0.1 to 30 percent by volume and more preferably 3 to 30 percent by volume.

In the gelatinous polymer electrolyte 113 having such a configuration, the gas 123 trapped in the pores 122 shrinks or expands with the change in the volume of the gelatinous polymer electrolyte 113. When the volume of the electrode sheets 112 and 114 changes with absorption and desorption of ions in the electrodes, the gelatinous polymer electrolyte 113 moderates a change in internal pressure of the sheet battery. Since the electrolyte solution 121 trapped in the pores 122 contributes to ion conduction, the gelatinous polymer electrolyte 113 exhibits improved ion conductivity compared to conventional solid polymer electrolytes, resulting in reduced internal resistance of the battery. The battery exhibits sufficient functions even if the electrolyte solution 121 is not trapped in the pores 122. When the volume of the electrolyte solution 121 is, however, less than 0.1 percent of the volume of the pores 122, the gelatinous polymer electrolyte 113 may have cracks which are formed by drying at the interface between the pores 122 and the gelatinous polymer electrolyte 113. Thus, it is preferable that the volume of the electrolyte solution 121 be at least 0.1 percent of the volume of the pores 122. When the volume of the electrolyte solution 121 is 3 percent or more of the volume of the pores 122, the ion conductivity is improved and the internal resistance of the battery is reduced. When the volume of the electrolyte solution 121 exceeds 30 percent of the volume of the pores 122, the gelatinous polymer electrolyte 113 may be dissolved at high temperatures and short-circuiting may readily occur. The battery exhibits superior advantages when the diameter of the pores 122 is in a range of 10 to 20 µm and the pores 122 occupy 0.1 to 30 percent by volume in the gelatinous polymer matrix.

EXAMPLES

Examples of the present invention will now be described.

Example 1

A plurality of positive-electrode sheets 11 was prepared. A slurry was prepared by dispersing 70 g of powdered $LiCoO_2$ and 4 g of powdered graphite (commercial name: Ketjenblack) into a polyvinylidene fluoride in N-methylpyrrolidone solution. At 60° C., 40 g of vinylidene fluoride/hexafluoropropylene copolymer (Kynar 2810 made by Elf Atochem S. A.) was dissolved into 200 g of dimethyl carbonate, and 80 g of an electrolyte solution was added while stirring to form electrolyte slurry. The slurry containing the active materials was applied onto an upper surface of a strip of aluminum foil having a width of 10 cm and a length of 1 m by a doctor blade process, and was dried to form an active material. Next, the electrolyte slurry was coated to cover the active material and was dried to form a polymer electrolyte layer. The strip of aluminum foil was cut to form ten positive-electrode sheets having a width of 10 cm and a length of 10 cm.

A strip of negative-electrode sheet was prepared. A slurry of 50 g of natural graphite flakes and a polyvinylidene fluoride in N-methylpyrrolidone solution was applied onto an upper face of a copper foil having a width of 10 cm and a length of 1 m by a doctor blade process and was dried to form an active material. Then, the above electrolyte slurry was applied onto the active material and was dried to form the strip of negative-electrode sheet. The positive-electrode sheets were bonded by thermal compression onto the negative-electrode sheet at a predetermined interval, which corresponded to the pitch of folds formed in the negative-electrode sheet, and the negative-electrode sheet was fan-folded at positions without the positive-electrode sheets, so that the positive-electrode sheets were inserted between the flat portions having a width of 10 cm and a length of 10 cm of the polymer electrolyte layer. A secondary lithium ion polymer battery of Example 1 was thereby prepared.

Comparative Example 1

Ten positive-electrode sheets were prepared as in Example 1. A strip of negative-electrode sheet was prepared as in Example 1, and then cut to form ten negative-electrode sheets having a width of 10 cm and a length of 10 cm. Each positive-electrode sheet, a polymer electrolyte layer, and each negative-electrode sheet were laminated by thermal compression bonding to form a laminate. Ten laminates were further laminated to prepare a lithium ion polymer secondary battery of Comparative Example 1. The effective area of the positive-electrode sheet or the negative-electrode sheet of this battery was as the same as the effective area of the battery of Example 1.

Test 1 for Comparison

Discharge capacity characteristics after a number of discharge-charge cycles and discharge capacities of the lithium ion polymer secondary batteries of Example 1 and Comparative Example 1 were measured using a charging/discharging tester. The results are shown in FIG. 9.

Evaluation 1

Figure 9:
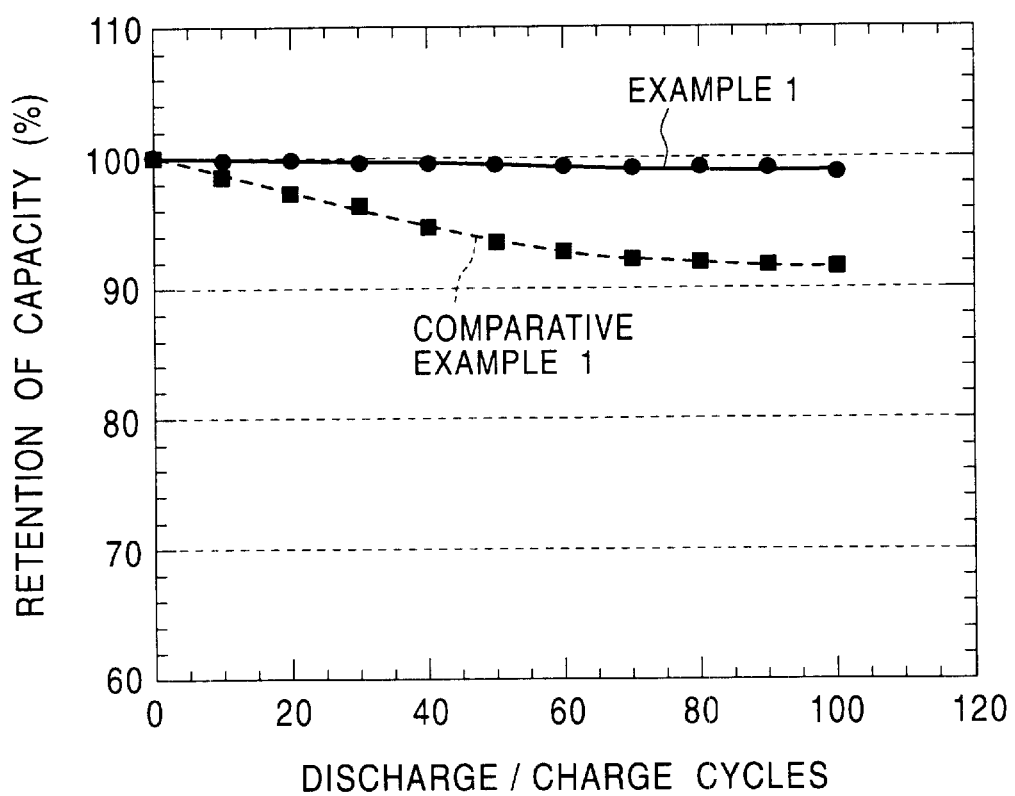
FIG. 9 is a graph of discharge capacity characteristics after a number of discharge-charge cycles of the secondary battery shown in FIG. 8.

FIG. 9 demonstrates that the slope of the retention (%) after cycle tests of the lithium ion polymer secondary battery of Example 1 is lower than that of Comparative Example 1. Thus, the lithium ion polymer secondary battery of Example 1 exhibits superior discharge capacity characteristics after a number of discharge-charge cycles to that of Comparative Example 1. The superior characteristics are considered to be due to the following difference in the configuration. The active materials on the ten positive-electrode sheets 11 in Example 1 are in contact with the same electrolyte layer whereas the active materials on the ten positive-electrode sheets in Comparative Example 1 are in contact with different electrolyte layers.

Example 2

A positive-electrode sheet was prepared. A slurry was prepared by dispersing 70 g of powdered $LiCoO_2$ and 4 g of powdered graphite (commercial name: Ketjenblack) into a polyvinylidene fluoride in N-methylpyrrolidone solution. The solid components in the slurry are composed of 89 percent by weight of $LiCoO_2$, 5 percent by weight of powdered graphite, and 6 percent by weight of polyvinylidene fluoride. The slurry was applied onto an upper surface of an aluminum foil by a doctor blade process, was dried, and was rolled to form a positive-electrode sheet provided with an active material layer having a thickness of 80 µm.

A negative-electrode sheet 14 was prepared. Slurry was prepared by dispersing 50 g of natural graphite flakes into a polyvinylidene fluoride in N-methylpyrrolidone solution. The solid components in the slurry were composed of 90 percent by weight of powdered graphite and 10 percent by weight of polyvinylidene fluoride. The slurry was applied onto an upper face of a copper foil by a doctor blade process, was dried, and rolled to form a negative-electrode sheet provided with an active material layer having a thickness of 50 µm.

Electrolyte slurry was prepared. At 60° C., 40 g of 88% vinylidene fluoride/12% hexafluoropropylene copolymer (Kynar 2810 made by Elf Atochem S. A.) was dissolved into 200 g of dimethyl carbonate, and 80 g of an electrolyte solution was added while stirring to form an electrolyte slurry having a viscosity of approximately 250 cP. The electrolyte solution contained 1 mole/liter of lithium hexafluorophosphate in an equivolume mixture of ethylene carbonate and diethyl carbonate.

The electrolyte slurry was applied onto a release paper sheet by a doctor blade process at 60° C., and was dried at 80° C. for 3 hours to prepare a gelatinous polymer electrolyte having many closed pores which were uniformly confined in the electrolyte and contained the electrolyte solution. The gelatinous polymer electrolyte was detached from the release paper sheet and was inserted between the positive-electrode sheet and the negative-electrode sheet to form a sheet battery of Example 2.

Example 3

The electrolyte slurry prepared in Example 2 was applied onto the negative-electrode sheet prepared in Example 2 by a doctor blade process at 50° C., and was dried at 80° C. for 3 hours to prepare a gelatinous polymer electrolyte having many closed pores which were uniformly confined in the electrolyte and contained the electrolyte solution. The positive-electrode sheet prepared in Example 2 was overlaid onto the gelatinous polymer electrolyte to form a sheet battery of Example 3 in which the gelatinous polymer electrolyte was inserted between the positive-electrode sheet and the negative-electrode sheet.

Example 4

The electrolyte slurry prepared in Example 2 was applied onto the positive-electrode sheet prepared in Example 2 by a doctor blade process at 50° C., and was dried at 80° C. for 3 hours to prepare a gelatinous polymer electrolyte having many closed pores which were uniformly confined in the electrolyte and contained the electrolyte solution. The negative-electrode sheet prepared in Example 2 was overlaid onto the gelatinous polymer electrolyte to form a sheet battery of Example 4 in which the gelatinous polymer electrolyte was inserted between the positive-electrode sheet and the negative-electrode sheet.

Comparative Example 2

The electrolyte slurry prepared in Example 2 was applied onto a release paper sheet by a doctor blade process at 80° C., and was dried at 60° C. for 3 hours to prepare a gelatinous polymer electrolyte not having pores. The gelatinous polymer electrolyte was detached from the release paper sheet and was inserted between the positive-electrode sheet and the negative-electrode sheet, which were prepared in Example 2, to form a sheet battery of Comparative Example 2.

Comparative Example 3

The electrolyte slurry prepared in Example 2 was applied onto a release paper sheet by a doctor blade process at 40° C., and was dried at 90° C. for 3 hours to prepare a gelatinous polymer electrolyte having open pores which were uniformly formed in the electrolyte and contained the electrolyte solution. The gelatinous polymer electrolyte was detached from the release paper sheet and was inserted between the positive-electrode sheet and the negative-electrode sheet to form a sheet battery of Comparative Example 3.

Test 2 for Comparison

Figure 14:
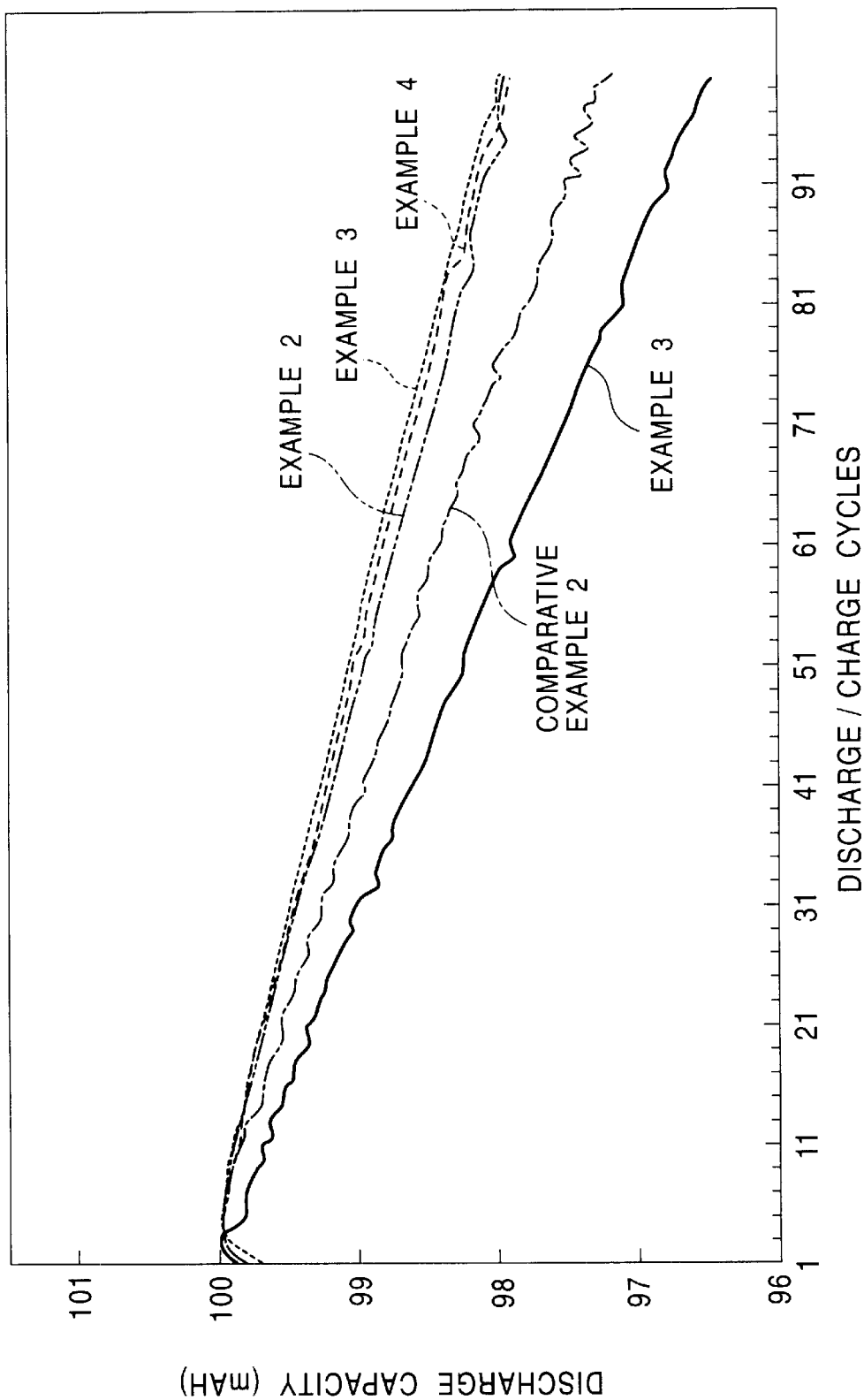
FIG. 14 is a graph of discharge capacity characteristics after a number of discharge-charge cycles of sheet batteries at 25° C.
Figure 15:
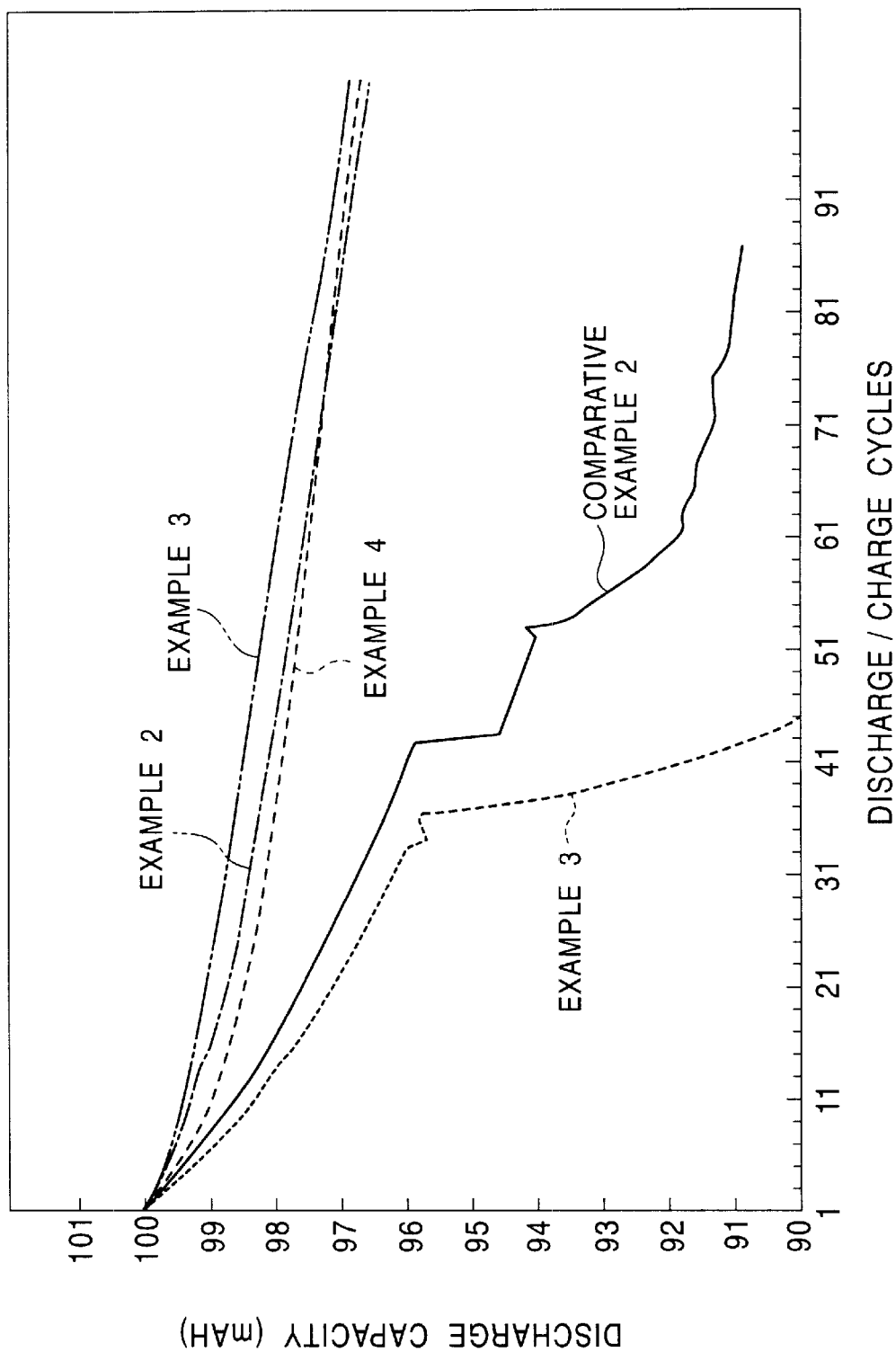
FIG. 15 is a graph of discharge capacity characteristics after a number of discharge-charge cycles of sheet batteries at 70° C.

Discharge capacity characteristics after a number of discharge-charge cycles of the sheet batteries of Examples 2 to 4 and Comparative Examples 2 and 3 were measured using a charging/discharging tester at 25° C. and 70° C. FIG. 14 is a graph of the results at 25° C., and FIG. 15 is a graph of the results at 70° C.

Evaluation 2

The pores in the gelatinous polymer electrolytes in Example 2 and Comparative Examples 2 and 3 were observed by a microscope. Closed pores having an average diameter of 15 μm were observed in Example 2, pores were not formed in Comparative Example 2, and open pores having an average diameter of 30 μm were formed in Comparative Example 3. These results suggest that the temperature and the time during drying the electrolyte slurry determine the sizes of the pores in the gelatinous polymer electrolyte.

FIG. 14 demonstrates that the decreases in the discharge capacities after a number of cycles of the tests of the sheet batteries of Examples 2 to 4 are less than those of Comparative Examples 2 and 3. Thus, the sheet batteries of the present invention exhibit superior discharge capacity characteristics after a number of discharge-charge cycles.

FIG. 15 demonstrates that the sheet batteries of Examples 2 to 4 exhibit superior discharge capacity characteristics after a number of discharge-charge cycles at high temperatures. In contrast, the sheet battery of Comparative Example 2 shows a decreased capacity due to separation between the polymer electrolyte and the electrodes, and the sheet battery of Comparative Example 3 shows short-circuiting due to dissolution of the electrolyte polymer.

What is claimed is:

1. A secondary lithium ion polymer battery comprising a laminate, comprising:
   a strip of positive-electrode sheet comprising a strip of positive-electrode collector foil and a first active material continuously provided on an extended surface of the positive-electrode collector foil;
   a plurality of negative-electrode segments, each comprising a negative-electrode collector foil and a second active material provided on the negative-electrode collector foil; and
   at least one polymer electrolyte layer;
   wherein said at least one polymer electrolyte layer is provided on at least one surface of the first active material, the strip of positive-electrode sheet is fan-folded at least one time thereby forming a plurality of flat portions in the structure of the positive-electrode sheet, each one of the plurality of negative-electrode segments has a surface area which corresponds to the surface area of one flat portion of the folded positive-electrode sheet with the result that the plurality of negative-electrode segments is interposed between the flat portions of the folded positive-electrode sheet, and said at least one polymer electrolyte layer is interposed between the first active material and each segment of the second active material.

2. A secondary lithium ion polymer battery according to claim 1, wherein said at least one polymer electrolyte layer is provided on at least one surface of each segment of second active material.

3. A secondary lithium ion polymer battery according to claim 1, wherein the polymer electrolyte layer covers the entire first active material so as to extend over at least one edge of the first active material.

4. A secondary lithium ion polymer battery according to claim 2, wherein the polymer electrolyte layer covers the entire second active material of each negative electrode segment so as to extend over at least one edge of the first active material.

5. A secondary lithium ion polymer battery according to claim 1, wherein one side edge of the positive-electrode collector foil protrudes from one side edge of each negative-electrode collector foil of each negative-electrode segment and the other side edge of each negative-electrode collector foil of each negative-electrode segment protrudes from the other side edge of the positive-electrode collector foil, with the protruding portions of the positive-electrode collector foil connected to a positive-electrode terminal, and the protruding portions of the negative-electrode collector foils connected to a negative-electrode terminal.

6. A secondary lithium ion polymer battery comprising a laminate, comprising:
   a strip of negative-electrode sheet comprising a strip of negative-electrode collector foil and a second active material continuously provided on an extended surface of the negative-electrode collector foil;
   a plurality of positive-electrode segments, each comprising a positive-electrode collector foil and a first active material provided on the positive-electrode collector foil; and
   at least one polymer electrolyte layer;

wherein said at least one polymer electrolyte layer is provided on at least one surface of the second active material, the strip of negative-electrode sheet is fan-folded at least one time thereby forming a plurality of flat portions in the structure of the negative-electrode sheet, each one of the plurality of positive-electrode segments has a surface area which corresponds to the surface area of one flat portion of the folded negative-electrode sheet with the result that the plurality of positive- electrode segments is interposed between the flat portions of the folded negative-electrode sheet, and said at least one polymer electrolyte layer is interposed between the second active material and each segment of the first active material.

7. A secondary lithium ion polymer battery according to claim 6, wherein said at least one polymer electrolyte layer is provided on at least one surface of each segment of first active material.

8. A secondary lithium ion polymer battery according to claim 6, wherein the polymer electrolyte layer covers the entire second active material so as to extend over at least one edge of the second active material.

9. A secondary lithium ion polymer battery according to claim 7, wherein the polymer electrolyte layer covers the entire first active material of each positive-electrode segment so as to extend over at least one edge of the first active material.

10. A secondary lithium ion polymer battery according to claim 1, wherein one side edge of the negative-electrode collector foil protrudes from one side edge of each positive-electrode collector foil of each positive-electrode segment and the other side edge of each positive-electrode collector foil of each positive-electrode segment protrudes from the other side edge of the negative-electrode collector foil, with the protruding portions of the negative-electrode collector foil connected to a negative-electrode terminal, and the protruding portions of the positive-electrode collector foils connected to a positive-electrode terminal.

11. A secondary lithium ion polymer battery, comprising:
at least one positive-electrode collector foil provided with a first active material on a surface thereof;
at least one negative-electrode collector foil provided with a second active material on a surface thereof; and
at least one polymer electrolyte layer;
wherein the positive-electrode collector foil, the polymer electrolyte layer, and the negative-electrode collector foil are laminated so that one side edge of the positive-electrode collector foil protrudes from one side edge of the negative-electrode collector foil and the other side edge of the negative-electrode collector foil protrudes from the other side edge of the positive-electrode collector foil,
wherein insulating films are provided on both side edges of the polymer electrolyte layer over the entire length so as to protrude from the side edges.

12. A secondary lithium ion polymer battery according to claim 11, wherein the ratio $t_2/t_1$ of thickness $t_2$ of the insulating film to thickness $t_1$ of the polymer electrolyte layer is in the range of 0.01 to 0.7.

13. A secondary lithium ion polymer battery according to claim 11, wherein ratio $s_2/s_1$ of the length $s_2$ of the protruding portion of the insulating film at the side edge of the polymer electrolyte layer to the length $s_1$ of the protruding portions of the negative-electrode collector foil and the positive-electrode collector foil is in a range of 0.02 to 0.8.

14. A gelatinous polymer electrolyte, interposed between a positive-electrode sheet and a negative-electrode sheet of a sheet battery, the gelatinous polymer electrolyte comprising a gelatinous polymer, having many closed pores substantially uniformly confined within the matrix of the gelatinous polymer which are filled with at least a gas and optionally an electrolyte solution.

15. A gelatinous polymer electrolyte according to claim 14, wherein the pores have diameters of 5 to 20 $\mu$m and occupy 0.1 to 30 percent by volume of the matrix of the gelatinous polymer.

16. A gelatinous polymer electrolyte according to one of claims 14 and 15, wherein the pores are filled with 0 to 30 percent by volume of the electrolyte solution and 70 to percent by volume of the gas.

17. A secondary lithium ion polymer battery according to claim 12, wherein ratio $s_2/s_1$ of the length $s_2$ of the protruding portion of the insulating film at the side edge of the polymer electrolyte layer to the length $s_1$ of the protruding portions of the negative-electrode collector foil and the positive-electrode collector foil is in a range of 0.02 to 0.8.

* * * * *